United States Patent
Stilin

(10) Patent No.: US 10,167,885 B2
(45) Date of Patent: Jan. 1, 2019

(54) MECHANICAL JOINT WITH A FLANGED RETAINER

(71) Applicant: United Technologies Corporation, Hartford, CT (US)

(72) Inventor: Nicholas D. Stilin, Higganum, CT (US)

(73) Assignee: United Technologies Corporation, Farmington, CT (US)

( * ) Notice: Subject to any disclaimer, the term of this patent is extended or adjusted under 35 U.S.C. 154(b) by 204 days.

(21) Appl. No.: 15/076,077

(22) Filed: Mar. 21, 2016

(65) Prior Publication Data

US 2017/0268546 A1    Sep. 21, 2017

(51) Int. Cl.
F16B 5/02       (2006.01)
F16B 43/00      (2006.01)
F16B 39/24      (2006.01)
F01D 25/24      (2006.01)

(52) U.S. Cl.
CPC .............. *F16B 5/02* (2013.01); *F01D 25/243* (2013.01); *F16B 39/24* (2013.01); *F16B 43/00* (2013.01); *F05D 2220/32* (2013.01)

(58) Field of Classification Search
CPC ........ F16B 5/02; F16B 5/0241; F16B 5/0266; F16B 5/01; F16B 43/00
USPC ................................................. 411/544, 546
See application file for complete search history.

(56) References Cited

U.S. PATENT DOCUMENTS

| | | | |
|---|---|---|---|
| 3,358,440 A | 12/1967 | Bernard | |
| 3,469,862 A | 9/1969 | Conibeer | |
| 3,561,793 A | 2/1971 | Rode | |
| 3,892,099 A * | 7/1975 | Worgan | E04C 2/20 52/479 |
| 2,886,885 A | 11/1977 | Reid, Jr. | |
| 4,193,434 A * | 3/1980 | Wagner | F16B 43/00 411/154 |
| 4,232,496 A * | 11/1980 | Warkentin | F16B 19/10 16/2.1 |
| 4,264,443 A * | 4/1981 | Anderson | B01D 29/05 210/167.08 |

(Continued)

FOREIGN PATENT DOCUMENTS

JP    2008051224    3/2008

OTHER PUBLICATIONS

Extended EP Search Report for EP Appln. No. 17162009.9 dated Jun. 29, 2017.

*Primary Examiner* — Flemming Saether
(74) *Attorney, Agent, or Firm* — O'Shea Getz P.C.

(57) ABSTRACT

A mechanical joint is provided between a first component and a second component. The mechanical joint includes a flanged retainer and a fastener. The flanged retainer includes a base and a flange. The base includes a bore and a counterbore that extends longitudinally along a centerline into the base from a longitudinal end of the base to the bore. The flange extends radially out from and circumferentially about the base at the longitudinal end of the base. The flange longitudinally engages the first component and the base projects longitudinally through the aperture and longitudinally engages the second component. The fastener includes an anchor and a shaft. The anchor is seated within the counterbore. The shaft projects longitudinally from the anchor, through the bore, and at least to the second component.

17 Claims, 12 Drawing Sheets

(56) References Cited

U.S. PATENT DOCUMENTS

| | | | |
|---|---|---|---|
| 5,054,983 A * | 10/1991 | Froewis | E04B 1/7633 411/480 |
| 5,131,811 A | 7/1992 | Johnson | |
| 5,584,511 A | 12/1996 | Gonzalez et al. | |
| 5,702,214 A | 12/1997 | Duran | |
| 5,848,874 A | 12/1998 | Heumann et al. | |
| 5,907,938 A * | 6/1999 | Sheahan | E04D 3/3603 411/531 |
| 6,065,756 A | 5/2000 | Eignor et al. | |
| 6,102,610 A | 8/2000 | Palusis et al. | |
| 6,264,412 B1 * | 7/2001 | Nakamura | F16B 5/01 411/107 |
| 6,267,327 B1 | 7/2001 | Siefker | |
| 6,702,300 B1 | 3/2004 | Steinetz et al. | |
| 7,153,054 B2 | 12/2006 | Arbona | |
| 7,581,301 B2 | 9/2009 | Arbona et al. | |
| 7,744,324 B2 * | 6/2010 | Bassani | F16B 43/00 411/368 |
| 7,810,816 B1 | 10/2010 | Halling | |
| 7,984,911 B2 | 7/2011 | Dobek et al. | |
| 8,016,297 B2 | 9/2011 | Heinemann et al. | |
| 8,057,146 B2 * | 11/2011 | Zeytoonian | H01J 37/09 411/372.5 |
| 8,418,473 B2 | 4/2013 | Petty et al. | |
| 8,459,936 B2 | 6/2013 | Damgaard et al. | |
| 8,607,577 B2 * | 12/2013 | Ruberte Sanchez | F01D 25/00 16/2.1 |
| 8,800,298 B2 | 8/2014 | Ladd et al. | |
| 8,894,335 B2 | 11/2014 | Bourdoulous | |
| 8,931,601 B2 | 1/2015 | Burt et al. | |
| 2004/0071548 A1 | 4/2004 | Wilson, Jr. | |
| 2005/0155305 A1 * | 7/2005 | Cosenza | F16B 5/01 52/317 |
| 2008/0075555 A1 | 3/2008 | March et al. | |
| 2008/0185789 A1 | 8/2008 | Kozlowski et al. | |
| 2008/0226419 A1 * | 9/2008 | Holt | F16B 5/0266 411/347 |
| 2009/0140497 A1 | 6/2009 | Roberts et al. | |
| 2009/0212501 A1 | 8/2009 | Glahn et al. | |
| 2011/0236188 A1 | 9/2011 | Knapp et al. | |
| 2014/0147266 A1 | 5/2014 | Kramer | |
| 2014/0157782 A1 | 6/2014 | Kramer | |
| 2014/0227093 A1 | 8/2014 | Barry | |
| 2014/0314547 A1 | 10/2014 | Sander et al. | |
| 2015/0211569 A1 * | 7/2015 | De La Mora Ramirez | F16B 43/02 411/546 |
| 2015/0219140 A1 | 8/2015 | Jenning et al. | |
| 2015/0354412 A1 | 12/2015 | Preston | |

\* cited by examiner

MECHANICAL JOINT WITH A FLANGED RETAINER

BACKGROUND OF THE INVENTION

1. Technical Field

This disclosure relates generally to a mechanical joint and, more particularly, to a mechanical joint with a fastener securing, for example, a composite component to a metal component.

2. Background Information

Various types and configurations of mechanical joints are known in the art. However, many of these mechanical joints cannot be utilized for securing a composite component to a metal component since many composite materials, due to their inherently brittle nature, can be particularly susceptible to damage when subjected to bolt loads.

There is a need in the art for an improved mechanical joint which can be used for, among other things, securing a composite component to a metal component without subjecting the composite to the highly concentrated bearing stresses created by fastener preload and additional bolt loads created by thermal expansion of the components being fastened together.

SUMMARY OF THE DISCLOSURE

According to an aspect of the present disclosure, a mechanical joint is provided that includes a first component with an aperture, a second component, a flanged retainer and a fastener. The flanged retainer includes a base and a flange. The base includes a bore and a counterbore that extends longitudinally along a centerline into the base from a longitudinal end of the base to the bore. The flange extends radially out from and circumferentially about the base at the longitudinal end of the base. The flange longitudinally engages the first component and the base projects longitudinally through the aperture and longitudinally engages the second component. The fastener includes an anchor and a shaft. The anchor is seated within the counterbore. The shaft projects longitudinally from the anchor, through the bore, and at least to the second component.

According to another aspect of the present disclosure, another mechanical joint is provided that includes a first component with an aperture, a second component, a flanged retainer and a bolt. The flanged retainer includes a tubular portion, an annular portion and a flange. The tubular portion extends longitudinally along a centerline between a first longitudinal end and a second longitudinal end. The annular portion extends radially inward from the tubular portion at the second longitudinal end. The flange extends radially out from and circumferentially about the tubular portion at the first longitudinal end. The flange longitudinally engages the first component. The tubular portion projects longitudinally through the aperture and the annular portion longitudinally engages the second component. The bolt includes a head and a shaft. The head is seated within the tubular portion. The shaft projects longitudinally from the head, through the annular portion, and at least partially into the second component.

The flange may be angularly offset from an adjacent outer circumferential side of the tubular portion by a first angle prior to assembly of the mechanical joint. The flange may be angularly offset from the adjacent outer circumferential side of the tubular portion by a second angle after assembly of the mechanical joint, and the second angle is larger than the first angle.

The second angle may be an acute angle.

The mechanical joint may be configured for a gas turbine engine. The second component may be a support structure of the gas turbine engine. The first component may be configured to provide an aerodynamic covering for the support structure.

The flange may be an annular flange that extends circumferentially around the base at the longitudinal end of the base.

The flange may be clamped between the flange and the second component. The base may be clamped between the anchor and the second component.

The flange may deform during assembly of the mechanical joint and thereby apply a preload longitudinally against the first component. The flanged retainer may be configured such that a magnitude of the preload is substantially independent of an amount of the deformation of the flange.

The flange may deform during assembly of the mechanical joint and thereby apply a preload longitudinally against the first component. The flanged retainer may be configured such that a magnitude of the preload is proportional to an amount of the deformation of the flange.

The flange may extend radially out from the base to a distal flange end. An end portion of the flange at the distal flange end may longitudinally engage a surface of the first component. An intermediate portion of the flange may extend radially between the base and the end portion and overlap the surface without engaging the surface.

The base may include a tubular portion and an annular portion. The tubular portion may extend longitudinally between the flange and the annular portion. The annular portion may extend radially inward from the tubular portion. The anchor (e.g., bolt head) may be seated against the annular portion.

The tubular portion may have a substantially circular cross-sectional geometry.

The tubular portion may have a laterally elongated cross-sectional geometry.

The fastener may include a bolt including the anchor and the shaft. The anchor may be a head of the bolt. The shaft may project at least partially longitudinally into (or through) the second component.

The flange may be seated within a counterbore in the first component.

The base may project longitudinally into a counterbore in the second component.

The second component may be configured from metal. In addition or alternatively, the first component may be configured from a composite and/or metal.

The foregoing features and the operation of the invention will become more apparent in light of the following description and the accompanying drawings.

DETAILED DESCRIPTION OF THE INVENTION

Figure 1:
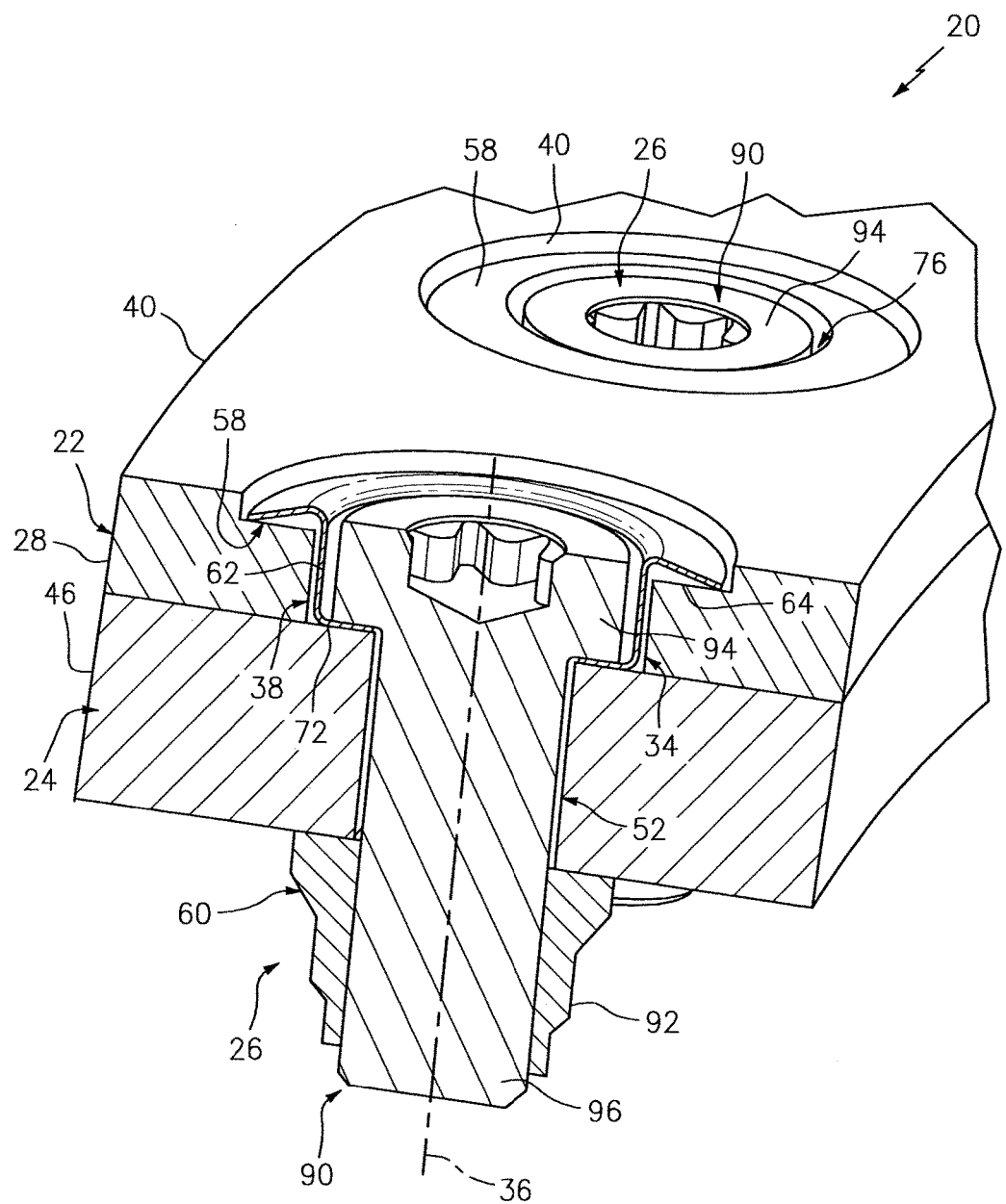
FIG. 1 is a perspective sectional illustration of a portion of a mechanical joint between a first component and a second component.

FIG. 1 is a perspective sectional illustration of a portion of a mechanical joint 20. This mechanical joint 20 includes a first component 22, a second component 24 and one or more fastener assemblies 26.

Figure 2:
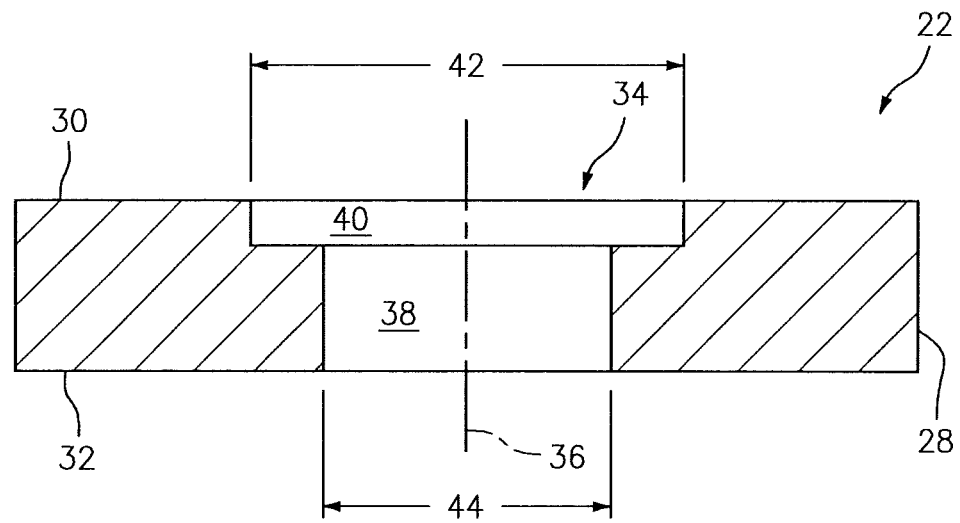
FIG. 2 is a sectional illustration of the first (e.g., composite) component.

Referring to FIG. 2, the first component 22 includes a first mount 28; e.g., a mounting portion. This first mount 28 may be a discrete, unitary body. Alternatively, the first mount 28 may be configured with another structure/portion of the first component 22. The first mount 28 includes and extends between opposing side surfaces 30 and 32. The first mount 28 is configured with one or more apertures 34.

Each of the apertures 34 extends longitudinally along a respective centerline 36 (e.g., axis) through the first mount 28 between the side surfaces 30 and 32. The aperture 34 of FIG. 2 includes a bore 38 and a counterbore 40. The bore 38 extends longitudinally through the first component 22 from the second side surface 32 towards the first side surface 30 and to the counterbore 40. The counterbore 40 extends longitudinally into the first component 22 from the first side surface 30 towards the second side surface 32 and to the bore 38. The counterbore 40 has a lateral width 42 (e.g., diameter) that is greater than a lateral width 44 (e.g., diameter) of the bore 38.

Figure 3:
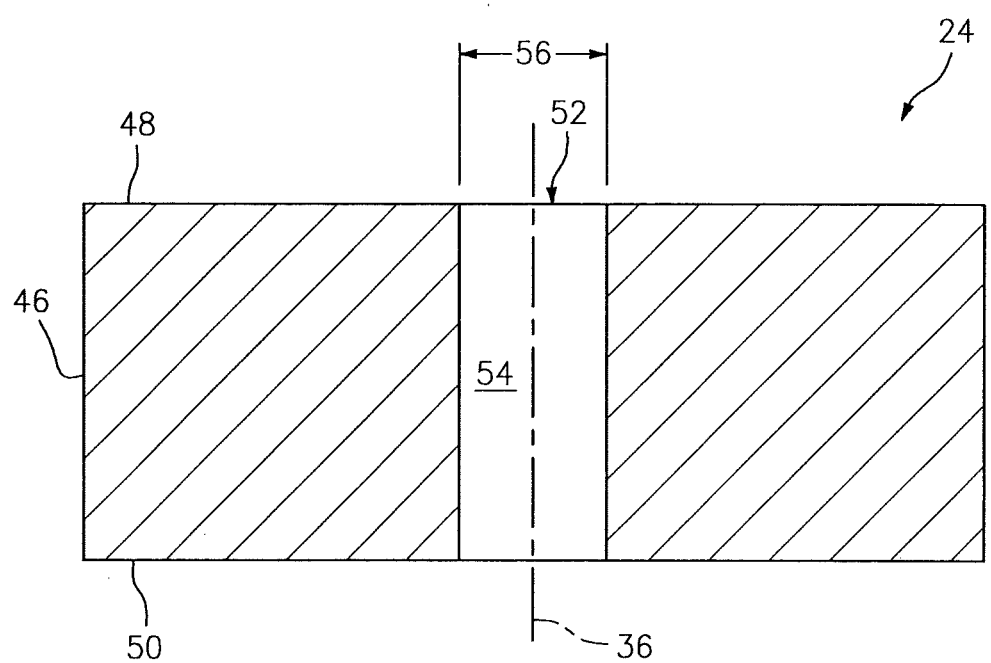
FIG. 3 is a sectional illustration of the second component.

Referring to FIG. 3, the second component 24 includes a second mount 46; e.g., a mounting portion. This second mount 46 may be a discrete, unitary body. Alternatively, the second mount 46 may be configured with another structure/portion of the second component 24. The second mount 46 includes and extends between opposing side surfaces 48 and 50. The second mount 46 may be configured with one or more apertures 52.

Each of the apertures 52 extends longitudinally along a respective centerline (e.g., the centerline 36) through the second mount 46 between the side surfaces 48 and 50. The aperture 52 of FIG. 3 includes a bore 54. The bore 54 extends longitudinally through the second component 24 from the first side surface 48 to the second side surface 50.

The bore 54 has a lateral width 56 (e.g., diameter) that is less than the lateral width 44 of the bore 38.

Referring to FIG. 1, the fastener assemblies 26 are configured to mechanically secure the first component 22 and the second component 24 together. Each of the fastener assemblies 26 includes a flanged retainer 58 and a fastener 60.

Figure 4:
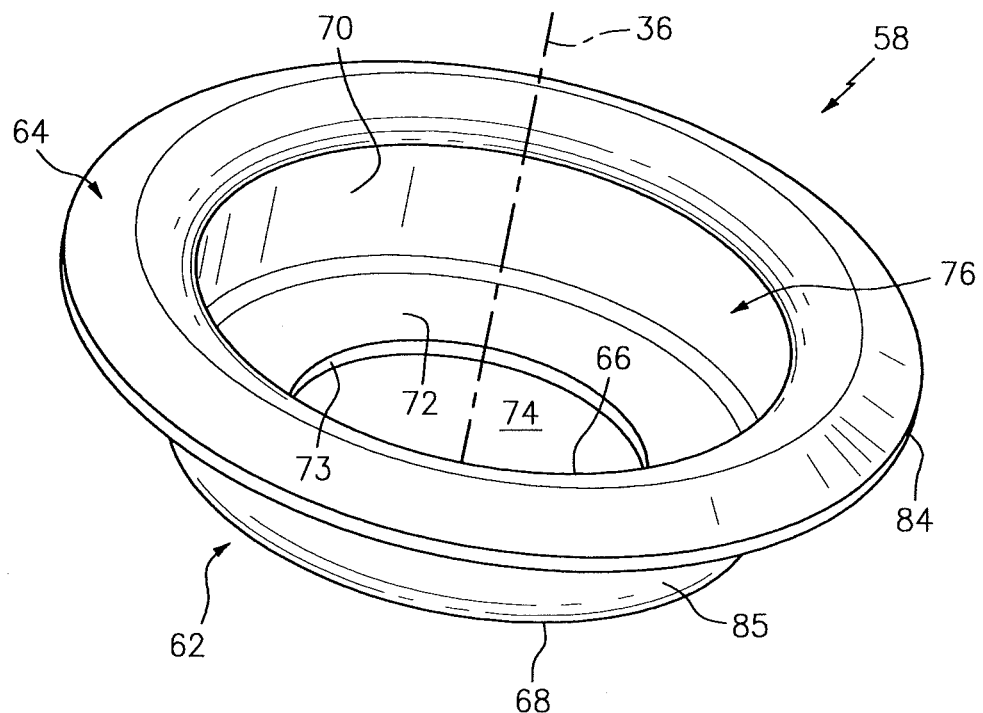
FIG. 4 is a perspective illustration of a flanged retainer for the mechanical joint.
Figure 5:
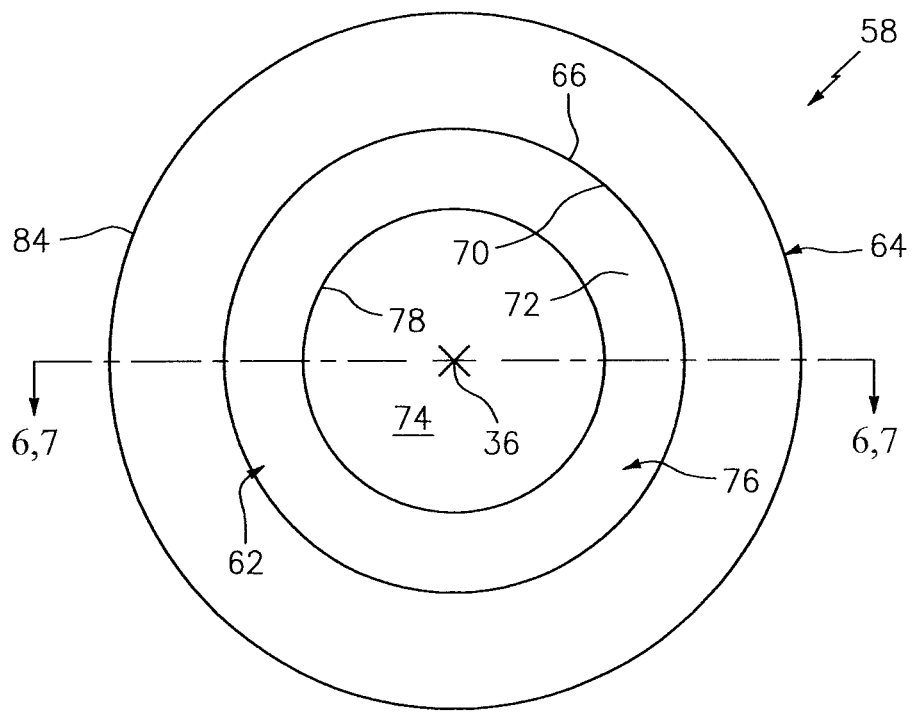
FIG. 5 is an end view (e.g., top view) illustration of the flanged retainer.
Figure 6:
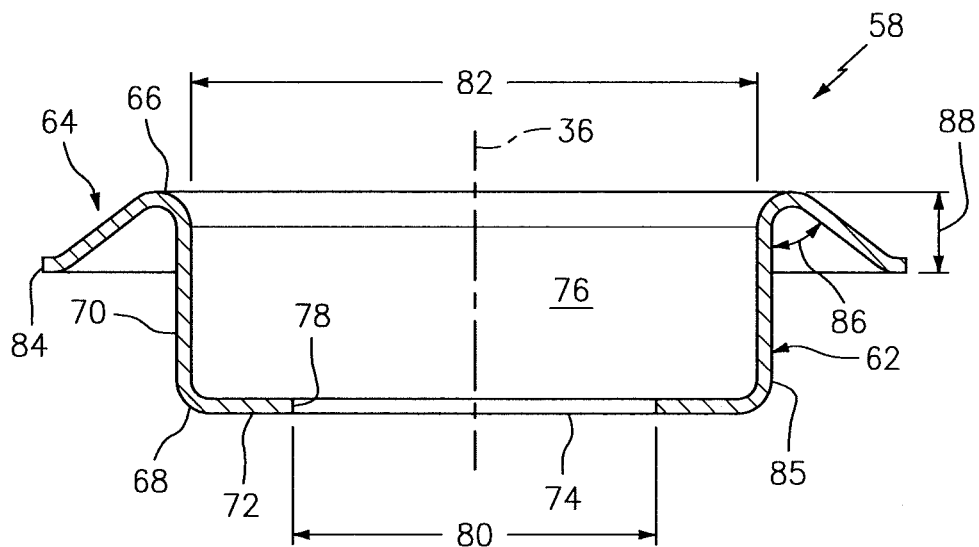
FIG. 6 is a sectional illustration of the flange retainer in a pre-assembly configuration.

Referring to FIGS. 4 to 6, the flanged retainer 58 includes a base 62 and a flange 64. The base 62 extends along a respective centerline (e.g., the centerline 36) between opposing longitudinal ends 66 and 68. The base 62 includes a tubular portion 70, an annular portion 72, a bore 74 and a counterbore 76 (best seen in FIG. 6).

The tubular portion 70 extends longitudinally between the longitudinal ends 66 and 68. The tubular portion 70 has a circular cross-sectional geometry (as best seen in FIG. 5). The annular portion 72 is located at (e.g., on, adjacent or proximate) the second longitudinal end 68. The annular portion 72 extends radially inward from the tubular portion 70 to an inner distal end 78. The inner distal end 78 has a circular cross-sectional geometry (as best seen in FIG. 5) and forms the bore 74, which extends longitudinally through the base 62 from the second longitudinal end 68 towards the first longitudinal end 66 and to the counterbore 76. This bore 74 has a lateral width 80 (e.g., diameter; see FIG. 6) that may be approximately equal to the lateral width 56 of the bore 54; see FIG. 3. Alternatively, the lateral width 80 may be (e.g., slightly) larger than the lateral width 54. The counterbore 76 is formed by the tubular portion 70 and the annular portion 72. In particular, the counterbore 76 extends longitudinally into the base 62 from the first longitudinal end 66 towards the second longitudinal end 68 and to the bore 74. The counterbore 76 has a lateral width 82 (e.g., diameter; see FIG. 6) that is greater than the lateral width 80 of the bore 74.

Figure 13:
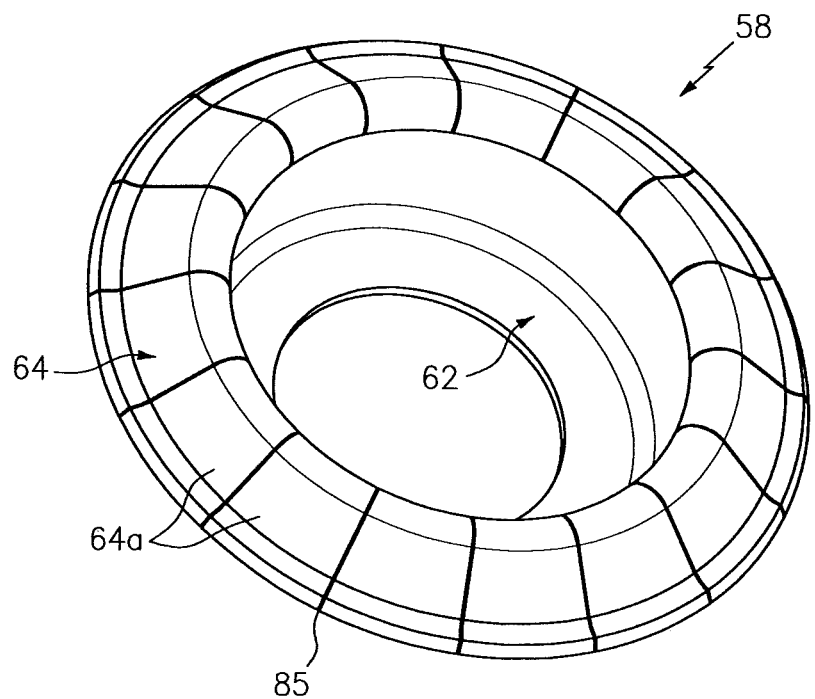
FIG. 13 is a perspective illustration of another flanged retainer for a mechanical joint.
Figure 14:
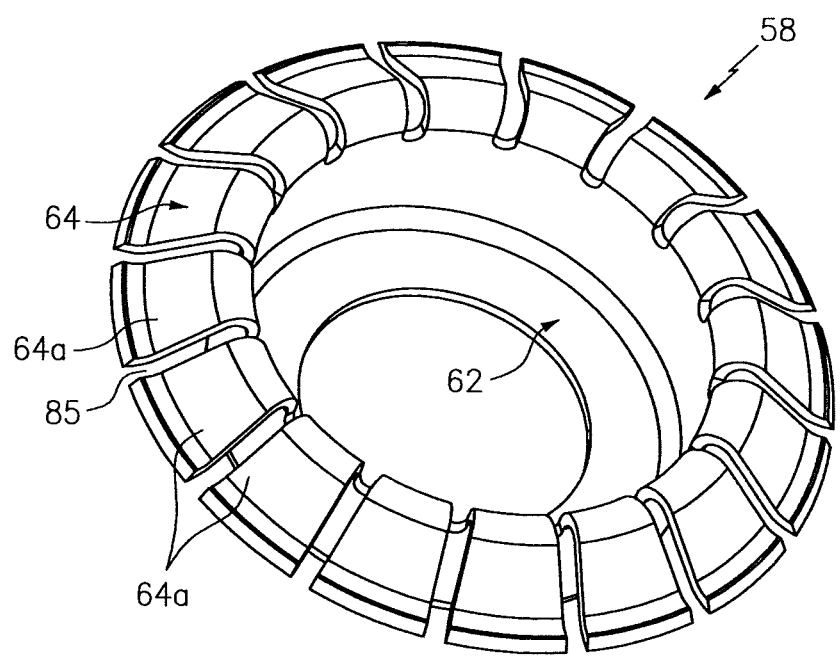
FIG. 14 is a perspective illustration of another flanged retainer for a mechanical joint.
Figure 15:
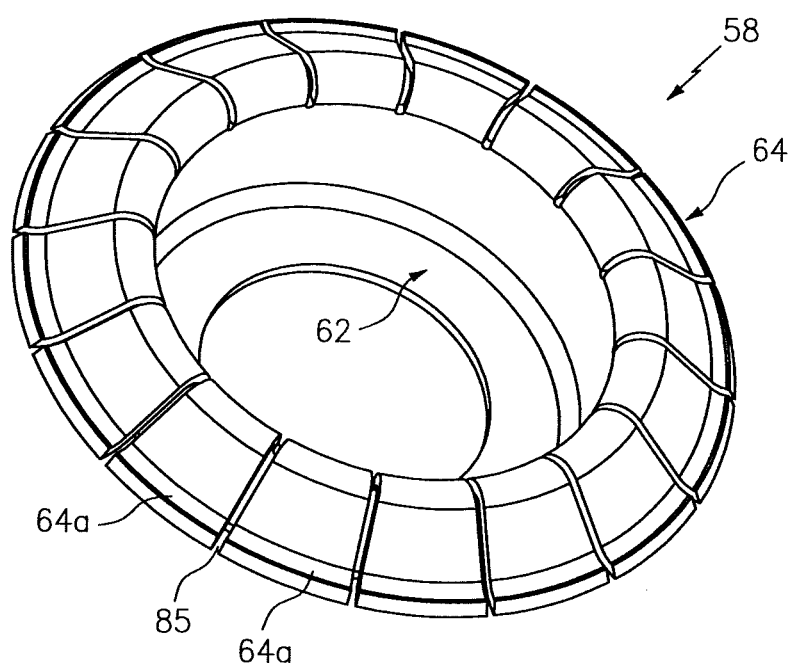
FIG. 15 is a perspective illustration of another flanged retainer for a mechanical joint.

The flange 64 is located at (e.g., on, adjacent or proximate) the first longitudinal end 66. The flange 64 extends radially outward from the tubular portion 70 to an outer distal flange end 84. The flange 64 extends circumferentially about the centerline 36 and the base 62. The flange 64 shown in FIGS. 4 and 5, in particular, extends circumferentially around the centerline 36 and thereby circumscribes the base 62 (e.g., the tubular portion 70). However, in other embodiments, the flange 64 may include an annular array of flange segments 64a as shown in FIGS. 13-15. In such embodiments, each adjacent pair of the flange segments 64a is separated by an air gap 85; e.g., a slit or channel. The air gap 85 may extend partially radially into the flange 64, or through the flange 64 and/or into the base 62. In the embodiment of FIG. 13, the narrow slits reduce the stiffness of the flange of the flanged retainer to reduce preload on the composite component while maintaining a smooth surface. This may be useful where reduced preload is required, but thinner gages of material from which the flanged retainer is fabricated are not readily available. In the embodiment of FIG. 14, the wide slits reduce the stiffness of the flange of the flanged retainer to reduce preload on the composite component where a smooth surface is not required. This may be useful where reduced preload is required, but thinner gages of material from which the flanged retainer is fabricated are not readily available.

In the pre-assembled state of FIG. 6, the flange 64 is configured to be angularly offset from an adjacent outer circumferential side 85 of the base 62 (e.g., the tubular portion 70) by an angle 86; e.g., an included angle between the flange 64 and the tubular portion 70. The angle 86 is an acute angle sized such that the axial length between the tip of the flange and the flange fillet is greater than the expected thickness variation of the components being joined so that when installed, contact between the flanged retainer and the first component occurs only at the tip of the flange. With this configuration, the outer distal flange end 84 is displaced from the first longitudinal end 66 of the base 62 by a longitudinal distance 88. As described below in further detail, both this distance 88 as well as the angle 86 will change upon assembly of the mechanical joint 20.

Referring to FIG. 1, each of the fasteners 60 may include a bolt 90 and a nut 92. The bolt 90 includes a bolt head 94 (e.g., an anchor) and a shaft 96.

During assembly of the mechanical joint 20, the first component 22 and the second component 24 are disposed with one another such that the apertures 34 are respectively aligned with the apertures 52. The flanged retainers 58 are respectively mated with the apertures 34. Each flanged retainer 58, in particular, is disposed within a respective one of the apertures 34 such that (A) its flange 64 is within the counterbore 40 and longitudinally engages (e.g., contacts) the first component 22 and (B) the base 62 projects longitudinally into the bore 38 towards the second component 24. The bolts 90 are respectively mated with the flanged retainers 58 and the apertures 52. The shaft 96 of each bolt 90, in particular, is inserted through a respective one of the retainer bases 62 and through a respective one of the apertures 52. The head 94 of each bolt 90 is seated within the counterbore 76. The nuts 92 are then respectively mated with the bolts 90. In this configuration the flanged retainer is installed in a through hole and counterbore in the first component, such that when the bolt is installed, the head of the bolt and the flanged retainer are flush with, or below the surface of the first component, as might be used on an aerodynamic surface.

Figure 7:
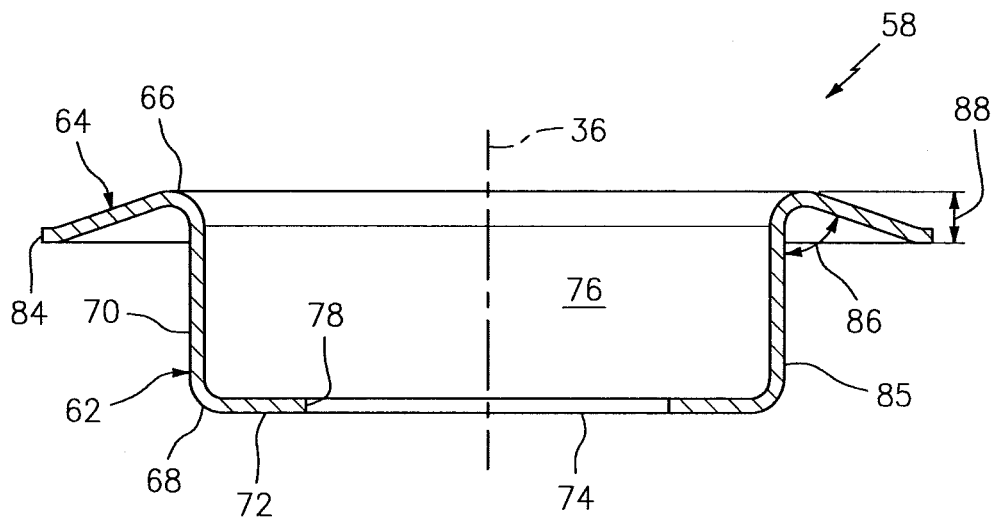
FIG. 7 is a sectional illustration of the flange retainer in a post-assembly configuration.

During the mating of the nuts 92 with the bolts 90, each nut 92 is screwed onto a respective shaft 96 and torqued until (A) the corresponding annular portion 72 of the base 62 and the second component 24 are clamped between the nut 92 and the bolt head 94 and (B) the first component 22 is clamped between the flange 64 and the second component 24 as shown in FIG. 1. As the bolt head 94 pulls the annular portion 72 of the base 62 towards the second component 24, the flange 64 deforms such that the flange 64 at least pivots away from the base 62. This deformation causes the angle 86 between the flange 64 and the base 62 to increase as shown in FIGS. 6 and 7, where FIG. 6 illustrates the flanged retainer 58 configuration in a relaxed state before mechanical joint 20 assembly and FIG. 7 illustrates the flanged retainer 58 configuration in a deformed state after mechanical joint 20 assembly. The deformation also causes the longitudinal distance 88 between the outer distal end 84 and the first longitudinal end 66 to decrease.

The foregoing deformation enable the bolts 90 and nuts 92 to be torqued to a relatively high value without exerting such high loads onto the first component 22. As a result, the bolts 90 and nuts 92 may take advantage of their primary retention; e.g., the threads being forced together. In contrast, without the flanged retainers 58, the bolts 90 and nuts 92 may need to be torqued to a lesser value to prevent crushing of the first component 22, which may not be great enough to take advantage of the primary retention.

Figure 8:
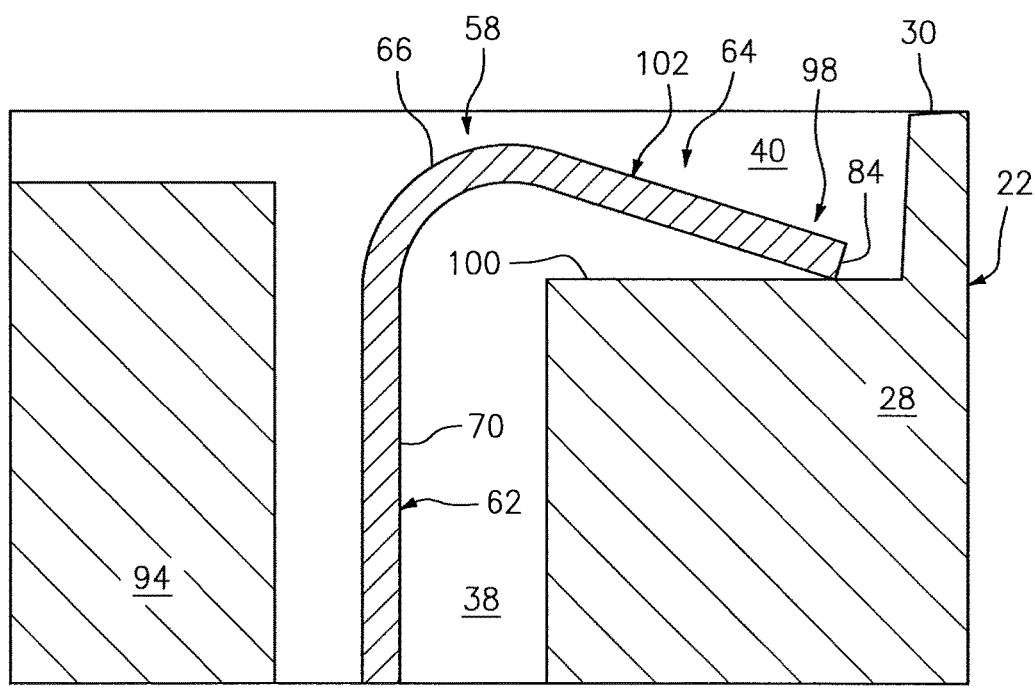
FIG. 8 is a partial sectional illustration of an interface between a flange of the flanged retainer and the first component.

In the embodiment of FIG. 7, the angle 86 is an acute angle. The longitudinal distance 88 is a non-zero longitudinal distance. In this manner, as shown in FIG. 8, an end portion 98 of the flange 64 at the outer distal flange end 84 longitudinally engages a surface 100 of the first component 22. However, an intermediate portion 102 of the flange 64, which extends from the base 62 to the end portion 98, merely overlaps the surface 100 without engaging the surface 100. As described above with respect to FIGS. 1 and 8, the flanged retainer 58 applies a clamping preload longitudinally against the first component 22 through the flange 64; e.g., the end portion 98 of the flange 64. The flanged retainer 58 may be configured such that a magnitude of the preload is substantially independent of an amount of deflection of the flange 64. For example, the flanged retainer 58 may be constructed from a plastically deformable material with a relatively low yield strength (e.g., below about 24 ksi) and a relatively high ultimate strength (e.g., above about 66 ksi). Examples of such materials include, but are not limited to, AMS 5510 material. Alternatively, the flanged retainer 58 may be configured such that the magnitude of the preload is substantially proportional to the amount of deflection of the flange 64. For example, the flanged retainer 58 may be constructed from an elastically deformable material with a relatively high yield strength (e.g., above about 140 ksi) and a relatively high ultimate strength. Examples of such materials include, but are not limited to, AMS 5892 material. The present disclosure, of course, is not limited to the foregoing exemplary materials. Furthermore, the yield strengths and the ultimate strengths are not limited to the foregoing exemplary values, and may change based on material properties as well as other design parameters; e.g., the thickness of the flanged retainer and the radial length of the flange of the flanged retainer.

Referring to FIG. 1, the clamping preload applied by the flange 64 to the first component 22 may be different from the clamping preload applied by the bolt head 94, through the annular portion 72 of the base 62, to the second component 24. More particular, due to the deformation (e.g., longitudinal deflection) of the flange 64, the preload against the first component 22 may be less than the preload against the second component 24. This may allow for forming the first and the second components 22 and 24 from different materials with different material strengths and/or different coefficients of thermal expansion. As a result, the first component 22 may be formed from a composite such as, but not limited to, a fiber reinforced resin impregnated material; e.g., a fiberglass composite, a carbon fiber composite, an aramid fiber composite, etc. In addition, it should be noted that the flange of the flanged retainer makes contact with the first component a relatively far distance from the bore in the first component thus reducing the stress concentration at the edge of the hole. In contrast, the second component 24 may be formed from a stronger material such as metal. However, in other embodiments, the first component 22 may also be formed from metal. The present disclosure, of course, is not limited to the foregoing exemplary materials.

Figure 9:
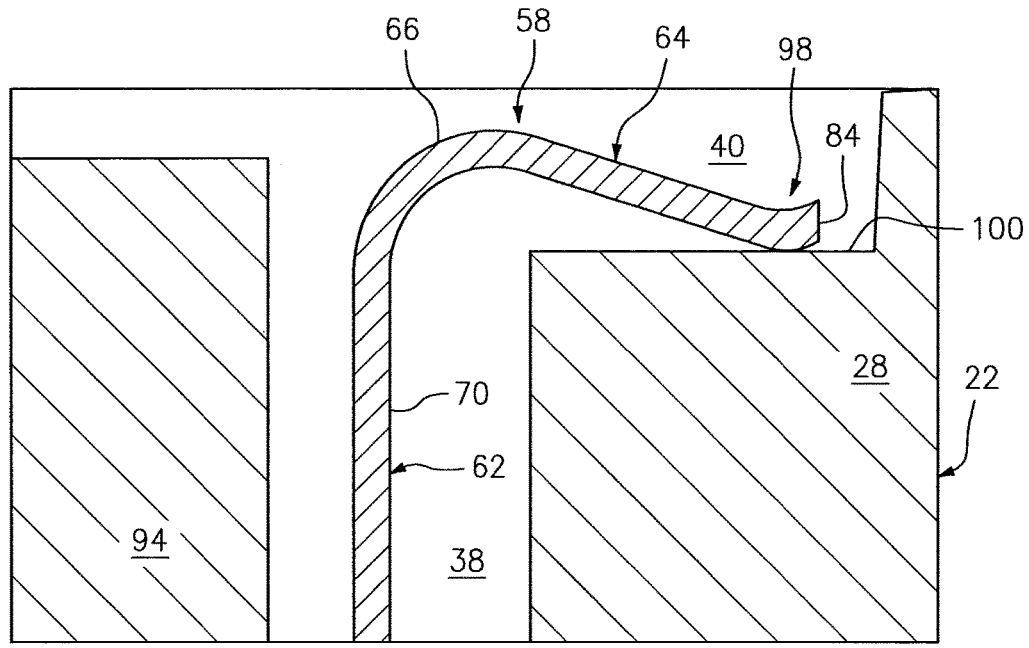
FIG. 9 is a partial sectional illustration of an interface between a flange of an alternative flanged retainer and the first component.
Figure 10:
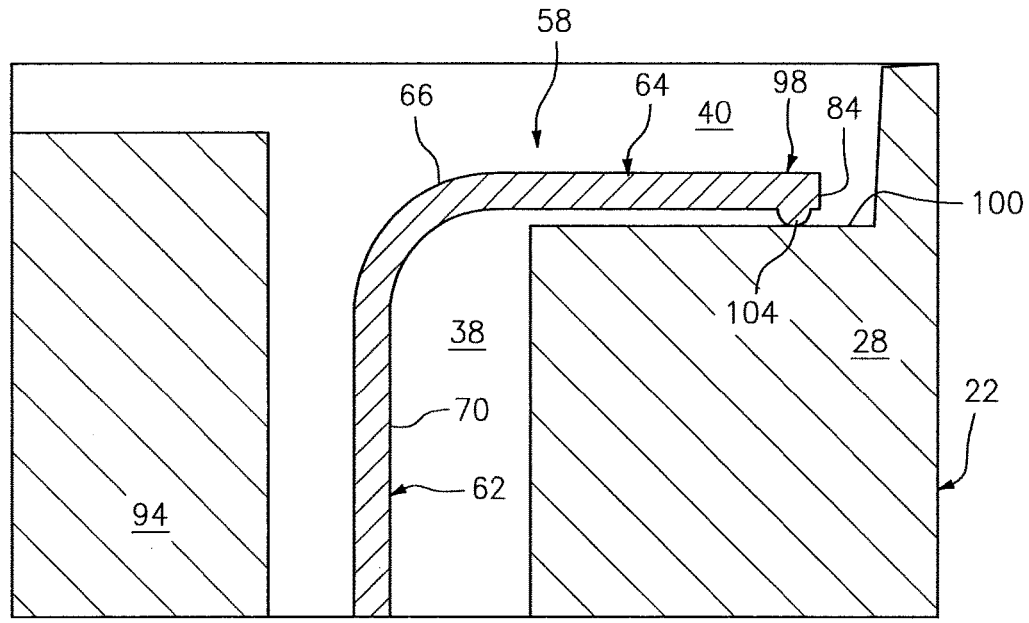
FIG. 10 is a partial sectional illustration of an interface between a flange of another alternative flanged retainer and the first component.

Referring to FIG. 8, in some embodiments, the flange 64 may be configured having a generally straight sectional geometry. However, in other embodiments, the flange 64 may have a curved and/or multi-faceted sectional geometry. For example, referring to FIG. 9, the flange 64 may have a curved sectional geometry at its outer distal flange end 84. In another example, referring to FIG. 10, the flange 64 may include at least one annular ridge 104 or a protrusion. Such geometries may enables smoother sliding between the end portion 98 of the flange 64 and the surface 100 of the first component 22.

Figure 11:
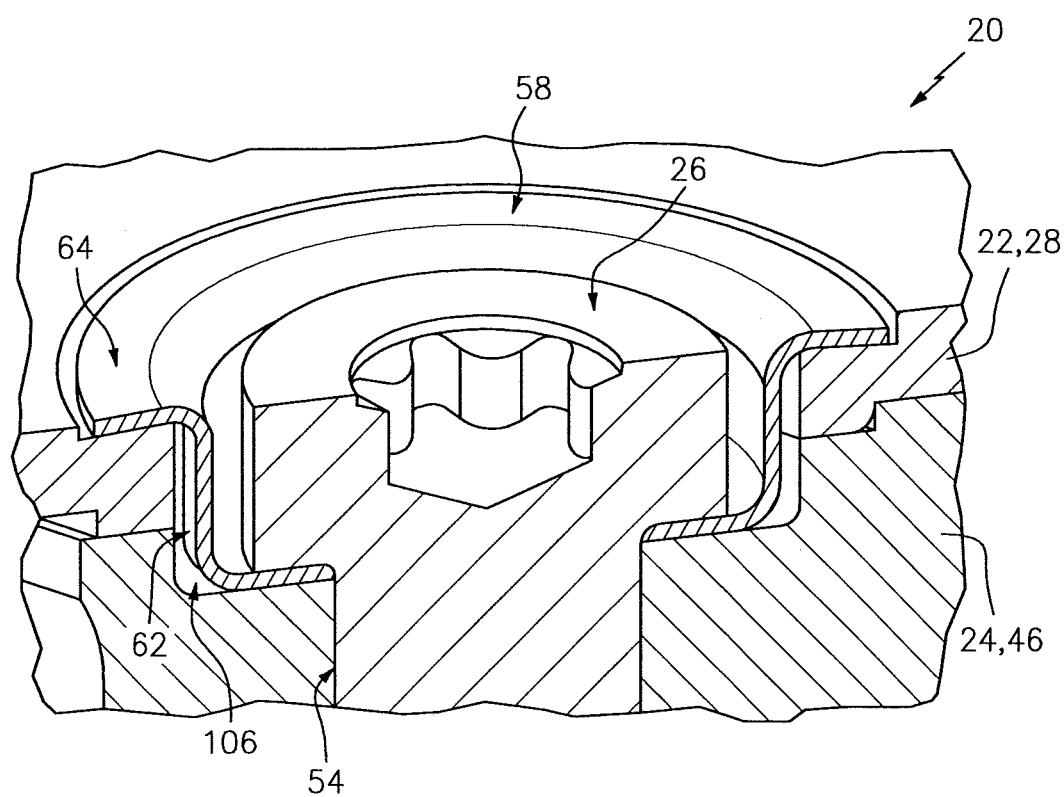
FIG. 11 is a perspective sectional illustration of the flanged retainer in a post-assembly condition.

Referring to FIG. 11, in some embodiments, one or more of the bases 62 may project longitudinally into a counterbore 106 in the second component 24. Such an arrangement may be useful where, for example, a thickness of the first component 22 is smaller than a longitudinal length of the flanged retainer 58.

In some embodiments, one or more of the fasteners 60 may each be configured as a bolt without a corresponding nut. Rather, the shaft of the bolt may be mated with the bore 54 where that bore 54 is tapped.

In some embodiments, one or more of the fasteners 60 may each be reversed such that the nut functions as the anchor for the flanged retainer 58 and the bolt head is abutted against the second side surface 50.

In some embodiments, one or more of the fasteners 60 may each be configured as a threaded stud and a nut. The threaded stud may extend out from the second component 24 and the nut may function as the anchor for the flanged retainer 58.

In some embodiments, the longitudinal engagement between the components of the mechanical joint 20 may be through direct engagement; e.g., contact. In other embodiments, the mechanical joint 20 may include one or more intermediate components not described above which provides an indirect engagement between respective components. For example, a washer may be disposed between the bolt head (e.g., the anchor) and the annular portion 72 of the base 62. A washer may be disposed between the annular portion 72 of the base 62 and the second component 24. A washer may be disposed between the flange 64 and the first component 22. At least one other component may be disposed between the first and the second components 22 and 24, etc.

Figure 16:
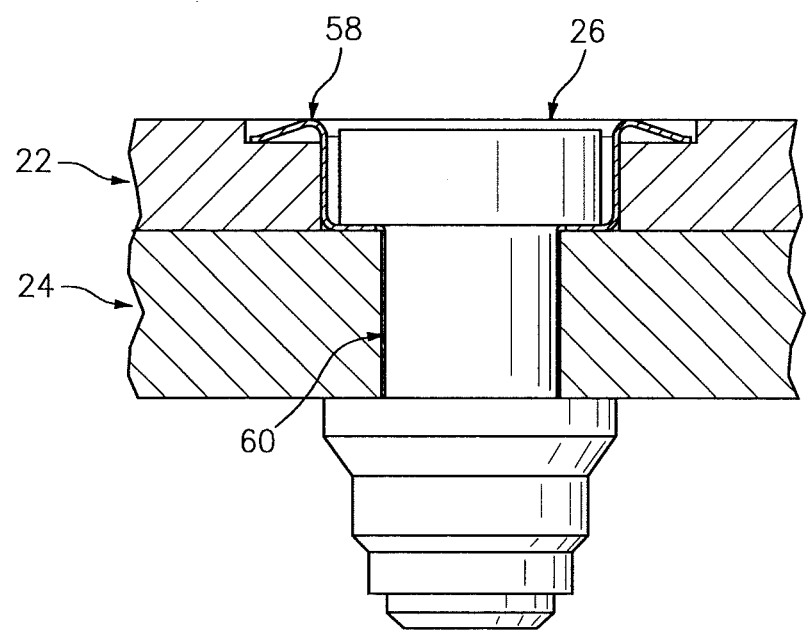
FIG. 16 is a sectional illustration of another flanged retainer for a mechanical joint.

In some embodiments, there may be a gap between the tubular portion 70 of the base 62 and the first component 22 as shown in FIG. 8. With such a configuration, the flanged retainer 58 will transmit little or no shear loads between the fastener 60 and the first component 22. However, in other embodiments, this gap may be substantially eliminated such that the flanged retainer 58 may transmit shear loads between the fastener 60 and the first component 22; e.g., see FIG. 16.

Figure 12:
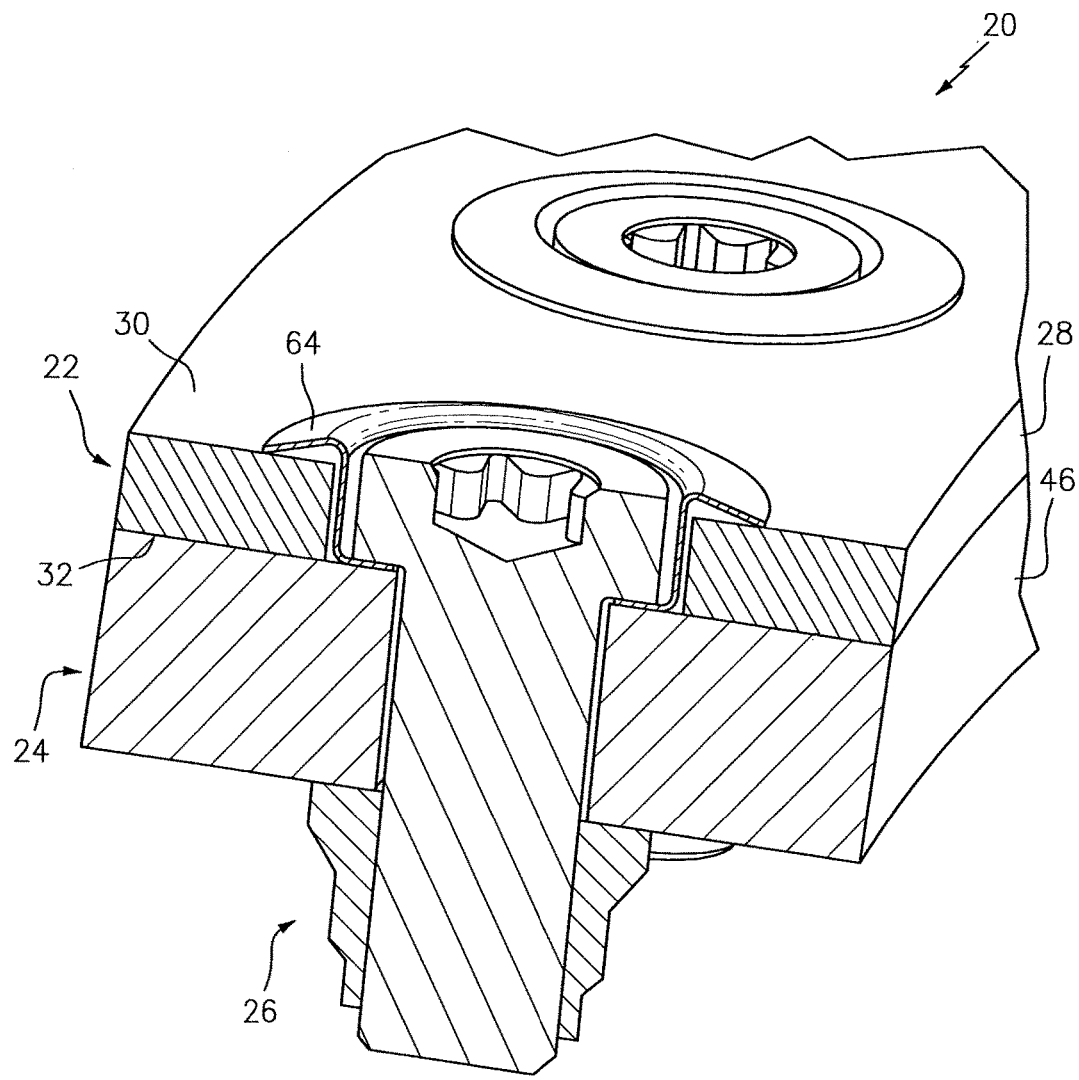
FIG. 12 is a perspective sectional illustration of a portion of another mechanical joint between a first component and a second component.

In some embodiments, referring to FIG. 12, the first component 22 can be configured without the counterbore 40 (see FIG. 1). In such a configuration, the bore 38 extends completely through the first component 22 between the surfaces 30 and 32, and the flange 64 engages the surface 30. In this configuration, the flanged retainer is installed in a through hole in the composite component, such that when the bolt is installed, the head of the bolt and the flanged retainer protrude above the surface of the composite component.

In some embodiments, the first and the second components 22 and 24 may be configured as components for an aero (or industrial) gas turbine engine, or another part of an associated aircraft propulsion system. For example, the second component 24 may be configured as a support structure (e.g., a strut, a casing, etc.) for the gas turbine engine. The first component 22 may be configured as an aerodynamic covering (e.g., a flowpath panel, a vane fairing, a nacelle panel, etc.) for the support structure. The present disclosure, of course, is not limited to the foregoing exemplary first and second components configurations.

Figure 17:
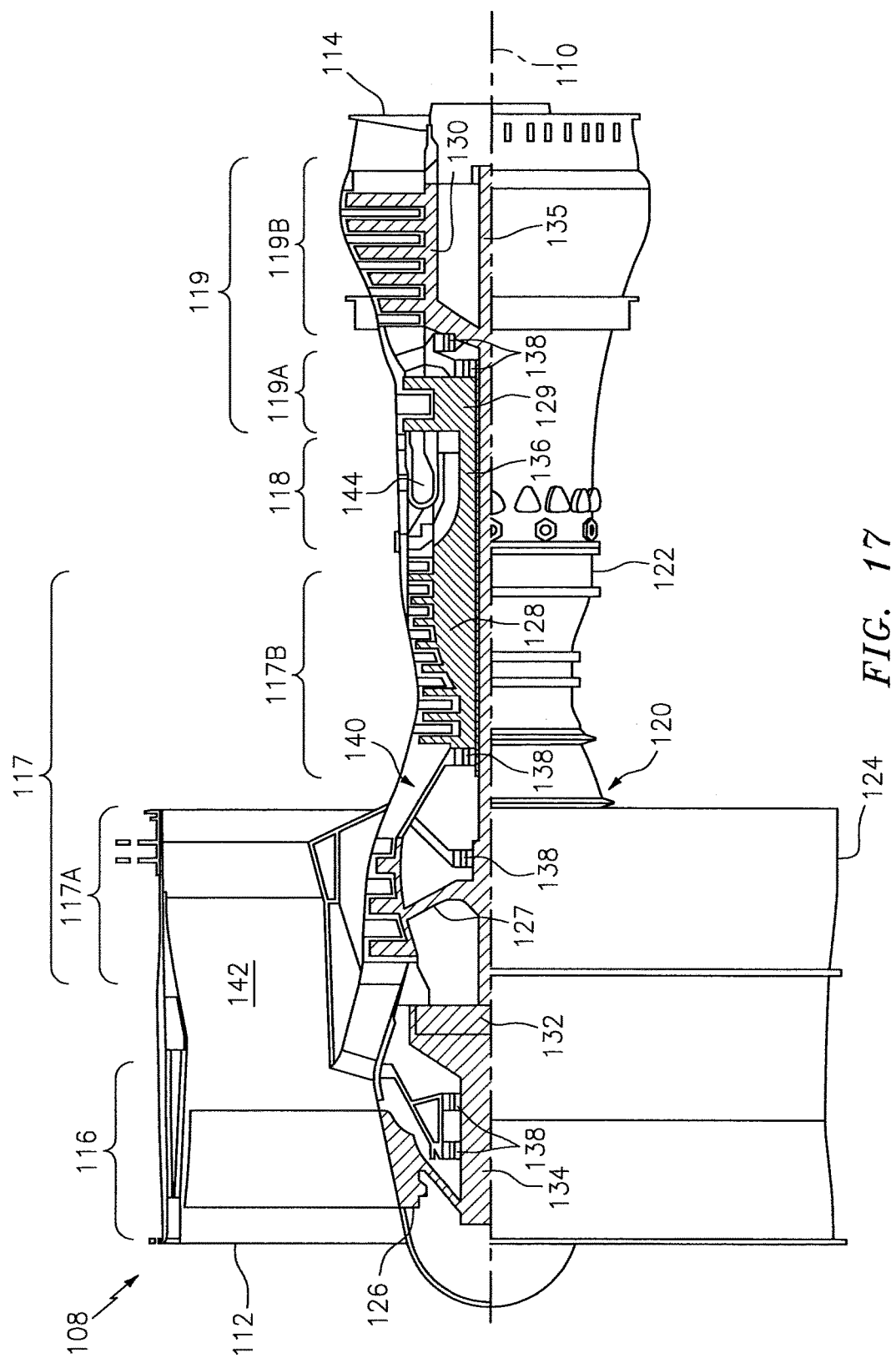
FIG. 17 is a side cutaway illustration of a geared turbofan gas turbine engine.

FIG. 17 illustrates an exemplary geared turbofan gas turbine engine 108 in which the mechanical joint 20 may be included. This turbine engine 108 extends along an axis 110 between an upstream airflow inlet 112 and a downstream airflow exhaust 114. The turbine engine 108 includes a fan section 116, a compressor section 117, a combustor section 118 and a turbine section 119. The compressor section 117 includes a low pressure compressor (LPC) section 117A and a high pressure compressor (HPC) section 117B. The turbine section 119 includes a high pressure turbine (HPT) section 119A and a low pressure turbine (LPT) section 119B.

The engine sections 116-119 are arranged sequentially along the axis 110 within an engine housing 120. This housing 120 includes an inner case 122 (e.g., a core case) and an outer case 124 (e.g., a fan case). The inner case 122 may house one or more of the engine sections 117-119; e.g., an engine core. The outer case 124 may house at least the fan section 116.

Each of the engine sections 116, 117A, 117B, 119A and 119B includes a respective rotor 126-130. Each of these rotors 126-130 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 126 is connected to a gear train 132, for example, through a fan shaft 134. The gear train 132 and the LPC rotor 127 are connected to and driven by the LPT rotor 130 through a low speed shaft 135. The HPC rotor 128 is connected to and driven by the HPT rotor 129 through a high speed shaft 136. The shafts 134-136 are rotatably supported by a plurality of bearings 138. Each of these bearings 138 is connected to the engine housing 120 by at least one stationary structure such as, for example, an annular support strut.

During operation, air enters the turbine engine 108 through the airflow inlet 112. This air is directed through the fan section 116 and into a core gas path 140 and a bypass gas path 142. The core gas path 140 extends sequentially through the engine sections 117-119. The bypass gas path 142 extends away from the fan section 116 through a bypass duct, which circumscribes and bypasses the engine core. The air within the core gas path 140 may be referred to as "core air". The air within the bypass gas path 142 may be referred to as "bypass air".

The core air is compressed by the compressor rotors 127 and 128 and directed into a combustion chamber 144 of a combustor in the combustor section 118. Fuel is injected into the combustion chamber 144 and mixed with the compressed core air to provide a fuel-air mixture. This fuel air mixture is ignited and combustion products thereof flow through and sequentially cause the turbine rotors 129 and 130 to rotate. The rotation of the turbine rotors 129 and 130 respectively drive rotation of the compressor rotors 128 and 127 and, thus, compression of the air received from a core airflow inlet. The rotation of the turbine rotor 130 also drives rotation of the fan rotor 126, which propels bypass air through and out of the bypass gas path 142. The propulsion of the bypass air may account for a majority of thrust generated by the turbine engine 108, e.g., more than seventy-five percent (75%) of engine thrust. The turbine engine 108 of the present disclosure, however, is not limited to the foregoing exemplary thrust ratio.

The mechanical joint 20 may be included in various aircraft and industrial turbine engines other than the one described above as well as in other types of equipment. The mechanical joint 20, for example, may be included in a geared turbine engine where a gear train connects one or more shafts to one or more rotors in a fan section, a compressor section and/or any other engine section. Alternatively, the mechanical joint 20 may be included in a turbine engine configured without a gear train. The mechanical joint 20 may be included in a geared or non-geared turbine engine configured with a single spool, with two spools (e.g., see FIG. 17), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A mechanical joint, comprising:
   a first component with an aperture;
   a second component;
   a flanged retainer including a base and a flange, the base including a bore and a counterbore that extends longitudinally along a centerline into the base from a longitudinal end of the base to the bore, and the flange extending radially out from and circumferentially about the base at the longitudinal end of the base, wherein the flange longitudinally engages the first component and the base projects longitudinally through the aperture and longitudinally engages the second component; and
   a fastener including an anchor and a shaft, the anchor seated within the counterbore, and the shaft projecting longitudinally from the anchor, through the bore, and at least to the second component;
   the flange configured to be angularly offset from an adjacent outer circumferential side of the base by a first angle prior to assembly of the mechanical joint;
   the flange configured to be angularly offset from the adjacent outer circumferential side of the base by a second angle after assembly of the mechanical joint; and
   the second angle larger than the first angle, wherein the second angle is an acute angle.

2. The mechanical joint of claim 1, wherein the flange is an annular flange that extends circumferentially around the base at the longitudinal end of the base.

3. The mechanical joint of claim 1, wherein the first component is clamped between the flange and the second component, and the base is clamped between the anchor and the second component.

4. The mechanical joint of claim 1, wherein
   the flange deforms during assembly of the mechanical joint and thereby applies a preload longitudinally against the first component; and
   the flanged retainer is configured such that a magnitude of the preload is substantially independent of an amount of the deformation of the flange.

5. The mechanical joint of claim 1, wherein
   the flange deforms during assembly of the mechanical joint and thereby applies a preload longitudinally against the first component; and
   the flanged retainer is configured such that a magnitude of the preload is proportional to an amount of the deformation of the flange.

6. The mechanical joint of claim 1, wherein
   the flange extends radially out from the base to a distal flange end;
   an end portion of the flange at the distal flange end longitudinally engages a surface of the first component; and
   an intermediate portion of the flange extends radially between the base and the end portion and overlaps the surface without engaging the surface.

7. The mechanical joint of claim 1, wherein
   the base includes a tubular portion and an annular portion;
   the tubular portion extends longitudinally between the flange and the annular portion;
   the annular portion extends radially inward from the tubular portion; and
   the anchor is seated against the annular portion.

8. The mechanical joint of claim 7, wherein the tubular portion has a substantially circular cross-sectional geometry.

9. The mechanical joint of claim 7, wherein the tubular portion has a laterally elongated cross-sectional geometry.

10. The mechanical joint of claim 1, wherein
    the fastener comprises a bolt that includes the anchor and the shaft;
    the anchor comprises a head of the bolt; and
    the shaft projects at least partially longitudinally into the second component.

11. The mechanical joint of claim 1, wherein the flange is seated within a counterbore in the first component.

12. The mechanical joint of claim 1, wherein the base projects longitudinally into a counterbore in the second component.

13. The mechanical joint of claim 1, wherein the second component comprises metal and the first component comprises a composite.

14. A mechanical joint, comprising:
    a first component with an aperture;
    a second component;
    flanged retainer including a tubular portion, an annular portion and a flange;
        the tubular portion extending longitudinally along a centerline between a first longitudinal end and a second longitudinal end;
        the annular portion extending radially inward from the tubular portion at the second longitudinal end; and
        the flange extending radially out from and circumferentially about the tubular portion at the first longitudinal end;
        wherein the flange longitudinally engages the first component, the tubular portion projects longitudinally through the aperture and the annular portion longitudinally engages the second component;
        the flange configured to be angularly offset from an adjacent outer circumferential side of the tubular portion by a first angle prior to assembly of the mechanical joint;
        the flange configured to be angularly offset from the adjacent outer circumferential side of the tubular portion by a second angle after assembly of the mechanical joint, the second angle larger than the first angle, and the second angle comprises an acute angle; and
    a bolt including a head and a shaft, the head seated within the tubular portion, and the shaft projecting longitudinally from the head, through the annular portion, and at least partially into the second component.

15. The mechanical joint of claim 14, wherein the mechanical joint is configured for a gas turbine engine, the second component is a support structure of the gas turbine engine, and the first component is configured to provide an aerodynamic covering for the support structure.

16. A mechanical joint, comprising:
   a first component with an aperture;
   a second component;
   a flanged retainer including a base and a flange, the base including a bore and a counterbore that extends longitudinally along a centerline into the base from a longitudinal end of the base to the bore, and the flange extending radially out from and circumferentially about the base at the longitudinal end of the base, wherein the flange longitudinally engages the first component and the base projects longitudinally through the aperture and longitudinally engages the second component; and
   a fastener including an anchor and a shaft, the anchor seated within the counterbore, and the shaft projecting longitudinally from the anchor, through the bore, and at least to the second component;
   wherein the flange is angularly offset from an adjacent outer circumferential side of the base by an acute angle;
   wherein the acute angle is a second angle;
   wherein the flange is configured to be angularly offset from the adjacent outer circumferential side of the base by a first angle prior to assembly of the mechanical joint: and
   wherein the second angle is larger than the first angle.

17. The mechanical joint of claim 16, wherein the flange is angularly offset from the adjacent outer circumferential side of the base by the acute angle after assembly of the mechanical joint.

* * * * *